United States Patent [19]
Cox

[11] Patent Number: 5,156,206
[45] Date of Patent: Oct. 20, 1992

[54] TUBING CONNECTOR

[75] Inventor: Don C. Cox, Roanoke, Tex.

[73] Assignee: Otis Engineering Corporation, Carrollton, Tex.

[21] Appl. No.: 722,130

[22] Filed: Jun. 27, 1991

[51] Int. Cl.⁵ .................. E21B 17/043; F16D 1/00
[52] U.S. Cl. ................................ 166/242; 285/323
[58] Field of Search ............. 166/384, 68, 106, 105, 166/380, 208, 242; 285/322, 323

[56] References Cited

U.S. PATENT DOCUMENTS

| | | | |
|---|---|---|---|
| 3,186,740 | 6/1965 | Lee | 285/323 X |
| 3,248,135 | 4/1966 | Meripol | 285/323 |
| 4,445,714 | 5/1984 | Kisiel, III | 285/323 X |
| 4,712,813 | 12/1987 | Passerell et al. | 285/323 X |
| 4,934,459 | 6/1990 | Baugh et al. | 166/380 |
| 5,056,830 | 10/1991 | Reaux | 285/323 |

Primary Examiner—William P. Neuder
Attorney, Agent, or Firm—Warren B. Kice

[57] ABSTRACT

A connector for connecting tubing to a component in a downhole well completion system in which a sub is provided for connection to the component and a sleeve extends over a portion of the sub to define a mandrel for receiving the tubing. A plurality of locking slips extend in windows provided through the sub and are forced into locking engagement with the reeled tubing as the sleeve is advanced over the sub to transfer axial and torsional loads from the component to the tubing.

46 Claims, 2 Drawing Sheets

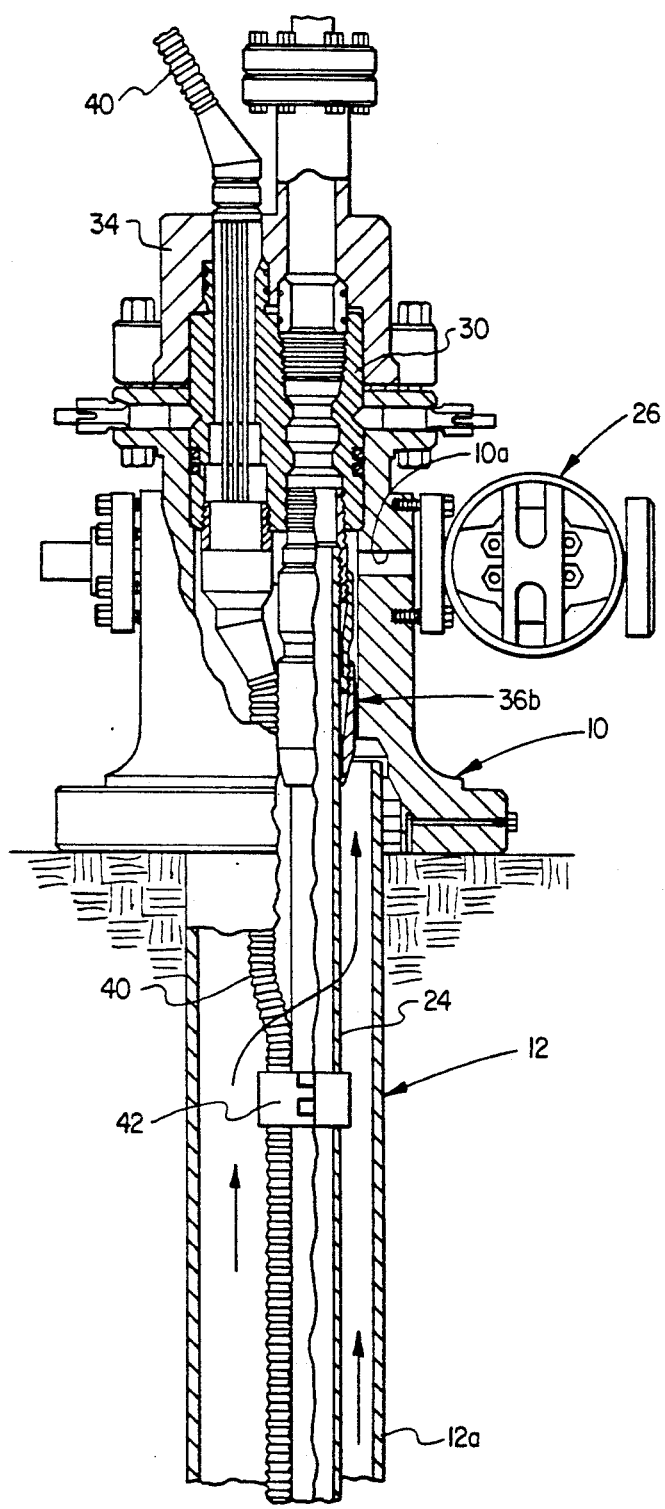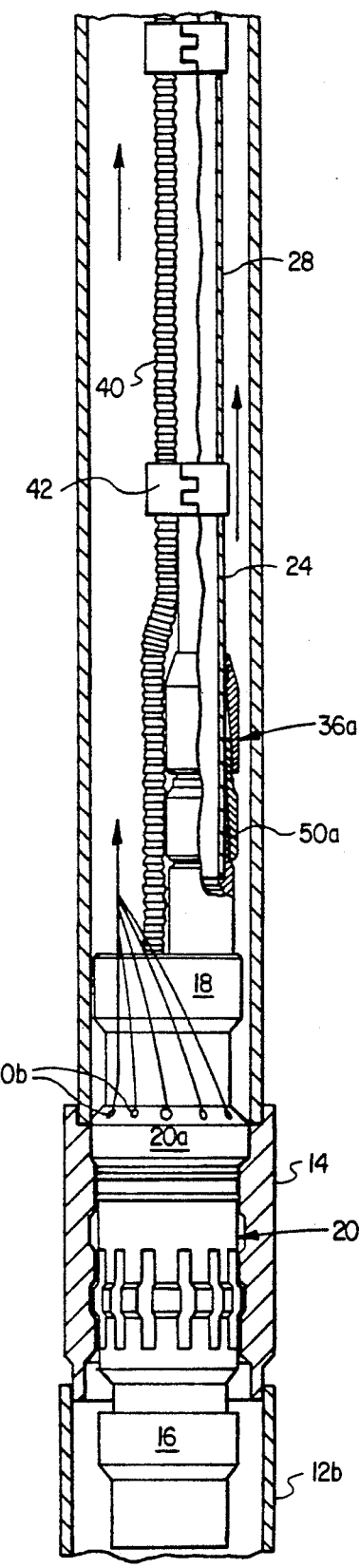
FIG. 1A
FIG. 1B

TUBING CONNECTOR

BACKGROUND OF THE INVENTION

This invention relates to a connector for connecting tubing to a component and, more particularly, to such a connector for connecting a section of thin wall tubing to downhole well tools in an oil and gas earth well completion system.

Many connections of the various components making up a well completion system require relative rotation between the various components. For example, when a section of tubing is attached to a well completion tool, matching threads are formed on the tool and the tubing, or to a sub attached to the tubing, so that the connection can be made by advancing and rotating one of the components relative to the other. An example of a connection between reeled tubing and a landing nipple in this manner is disclosed in U.S. Pat. No. 4,669,537, assigned to the assignee of the present invention. However, these type of connections have stress limitations that are well below the stress limitations of a continuous section of reeled tubing.

These type of connections are especially important in connection with downhole tools having a rotary component, such as electrical submersible well pumps which are often used in well completion systems to pump production fluid from a formation, into and through a casing string and a production tubing string, and to a wellhead above surface. Various systems and techniques have been used to install and connect pumps in this environment. For example, the pump is often attached to a production tubing string as shown in U.S. Pat. Nos. 4,502,536 and 4,589,482, or to a mandrel as shown in U.S. Pat. No. 4,749,341. However, in these arrangements, potential leaks occur at the joints between the various sections of the tubing string and the mandrel.

Reeled tubing i.e. continuous, relatively thin-walled, bendable tubing, is becoming more and more popular in downhole servicing of oil and gas wells since it has many advantages when compared to wireline or connected tubing sections. Although reeled tubing would also be ideally suited for well completion systems, since it would eliminate the multiple joints between the above-mentioned tubing string or mandrel sections, it has not enjoyed widespread use in this manner for several reasons. For example, its relatively thin walls preclude threading for attaching the tubing to completion equipment such as pumps, landing nipples, safety values, well hangers, etc. Even if the reeled tubing could be threaded, this would present problems in the field, especially in connection with reeled tubing having relatively large outer diameters. Also, since many existing connectors that connect tubing to associated equipment do not absorb, or transfer, torsional loads they would not be suitable for connecting reeled tubing to a downhole completion component having a rotary member, such as an electrical motor which drives a submersible pump.

SUMMARY OF THE INVENTION

It is therefore an object of the present invention to provide a connector for connecting relatively thin wall tubing, such as reeled tubing, to an associated component for installation downhole in a well completion system.

It is a further object of the present invention to provide a connector of the above type which can be connected to the tubing without stressing or damaging the tubing.

It is still further object of the present invention to provide a connector of the above type which connects the tubing to a component in a manner to transfer both axial and torsional loads.

It is a further object of the present invention to provide a connector of the above type for connecting reeled tubing to downhole well completion tools.

It is a further object of the present invention to provide a connector of the above type for connecting reeled tubing relative to an electrical motor which drives a submersible pump downhole in a casing string.

It is a still further object of the present invention to provide a well completion system in which fluid pumped by the submersible pump passes uphole in an annular path defined between the reeled tubing and the casing string.

Toward the fulfillment of these and other objects, the connector of the present invention includes a sub for connecting to a corresponding member of a rotating component. A connector sleeve extends over the upper portion of the sub and, together with the sub, defines a mandrel for receiving the end portion of a section of reeled tubing. A plurality of windows are provided through the sub which receive locking slips and, as the sleeve is advanced over the sub, it forces the locking slips radially inwardly into locking engagement with the reeled tubing to connect the tubing to the member and transfer axial and torsional loads from the member to the tubing.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings wherein:

FIGS. 1A and 1B are longitudinal cross-sectional views of a well completion system incorporating the connector of the present invention, with FIG. 1B being a downward continuation of FIG. 1A;

DESCRIPTION OF THE PREFERRED EMBODIMENTS

Figure 2:
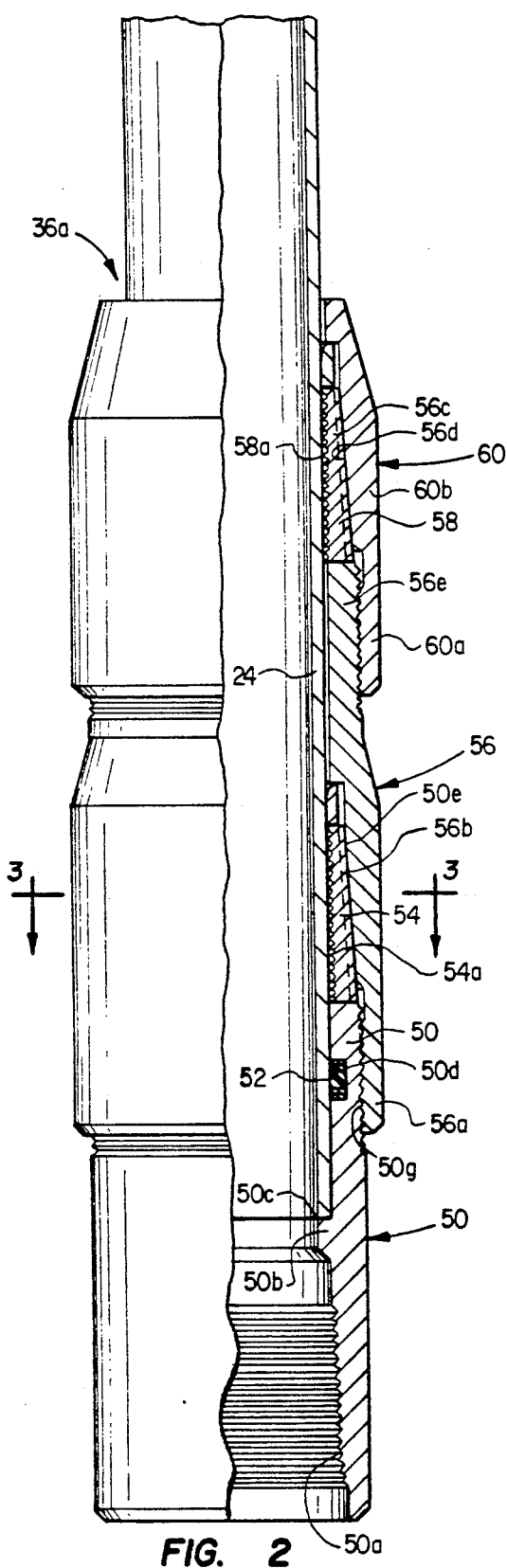
FIG. 2 is an enlarged cross-sectional view of the connector of the present invention.

Referring to FIGS. 1A and 1B of the drawings, the reference numeral 10 refers, in general, to a wellhead extending above and at the surface of an oil and gas earth well. A production tubing string 12 is disposed in the well and has an upper section 12a, as viewed in FIGS. 1A and 1B, extending downwardly from the wellhead 10 to a landing nipple 14 (FIG. 1B) at a predetermined depth in the well, and a lower section 12b (FIG. 1B) extending from the landing nipple 14 further into the well. It is understood that the tubing string 12 will typically be concentrically disposed within an outer casing string (not shown) which extends from the wellhead 10 at the surface of the well to an underground hydrocarbon producing formation. In the latter context, perforations would be provided through the casing string to allow fluid communication between the interior of the casing string and the formation adjacent thereto, and well production equipment (not shown) would be provided in the casing string. For example, a production well packer, or the like, would be installed in the casing string above the perforations to direct well fluid flow from the formation into the casing string from which it passes through suitable openings into the tubing string 12 and is pumped to the well surface. Examples of such well completion equipment with a wide variety of available down hole equipment are shown in more detail in U.S. Pat. Nos. 4,625,798 and 4,749,341.

An electrical submersible pump 16 is located in the lower tubing string section 12b and is connected to a prime mover, such as an electrical motor 18, via a locking module assembly 20 extending within, and releaseably engaged with, the landing nipple 14. A discharge head 20a is provided at the upper portion of the locking module assembly 20 and has a plurality of discharge ports 20b to direct well fluid discharged from the pump 16 through the tubing string 12 to the well surface in a manner to be described.

The upper tubing string section 12a terminates at the lower portion of the wellhead 10, and a section of reeled tubing 24 is disposed in the wellhead 10 and extends through the upper tubing string section 12a. The design is such that the well fluid passes through the annular passage defined between the outer surface of the reeled tubing 24 and the inner surface of the tubing string 12, as will be described in greater detail. A plurality of horizontal, angularly-spaced passages 10a (one of which is shown) are provided through the wellhead 10 for receiving the well fluid and passing it to a wing valve 26, for selective discharge in a conventional manner.

A hanger sleeve 30 is located in the upper portion of the wellhead 10 and a wellhead cap 34 extends over the wellhead 10 and is removable for permitting access to the interior of the tubing string 12. The hanger sleeve 30 and the wellhead cap 34 are parts of what is often referred to as a "Christmas tree," which, along with the wellhead 10 and their associated components, are conventional and therefore will not be described in any further detail. Although not shown in the drawings, it is understood that a lubricator, or the like (not shown) can be mounted above the wellhead cap 34.

A connector 36a (FIG. 1B) connects the lower end portion of the reeled tubing 24 to a sub, or the like, extending from the electrical motor 18, and a connector 36b (FIG. 1A) connects the upper end portion of the tubing 24 to the lower portion of the hanger sleeve 30. The connectors 36a and 36b are very similar and will be described in detail later.

An insulated power cable 40 extends from the electric motor 18 upwardly through the upper tubing string section 12a and through molded sleeves provided in the wellhead 10. The cable 40 is shown without its insulated cover in the wellhead 10, and projects from the wellhead cap 34 to an external source of electrical energy (not shown). A plurality of bands 42 are disposed at spaced intervals along the reeled tubing 24 and connect the power cable 40 to the latter tubing. This technique of clamping the power cable 40 to the reeled tubing 24, as well as the technique of deploying an electrical submersible pump in oil wells using reeled tubing, is more specifically disclosed in co-pending U.S. patent application Ser. No. 07/665,086 filed on Feb. 14, 1991 and assigned to the assignee of the present invention. Also, the locking module assembly 20, as well as a method and system for releaseably attaching a submersible pump with its power cable at a downhole location in a well bore defined in part by a landing nipple in a production tubing string are disclosed in more detail in U.S. Pat. No. 4,913,239 which is also assigned to the assignee of the present invention.

Figure 3:
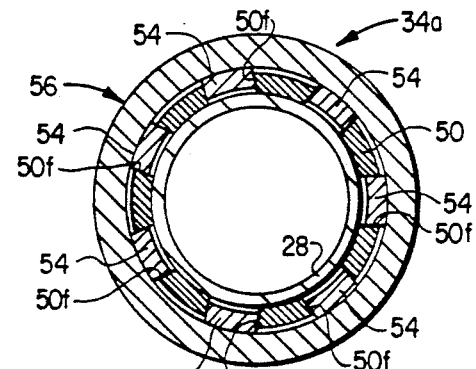
FIG. 3 is a horizontal cross-sectional view taken along the line 3—3 of FIG. 2.

The connector 36a is depicted in detail in FIGS. 2 and 3 and includes a end sub 50, having a lower end portion, as viewed in FIG. 2, provided with internal threads 50a to receive a corresponding externally threaded sub, or sleeve (not shown) of the motor 18. An annular flange 50b is formed on the inner surface of the sub 50 to define a shoulder 50c. The connector 36a receives the reeled tubing 24 with the corresponding end of the reeled tubing 24 abutting against the shoulder 50c which thus functions as a load-bearing surface. An annular groove 50d is formed in the inner surface of the sub 50 which receives an elastomeric seal ring 52 for engaging a corresponding portion of the outer wall of the reeled tubing 24.

The outer surface of the upper end portion 50e of the sub 50 is tapered inwardly and, as better shown in FIG. 3, seven angularly-spaced windows 50f are formed through the tapered sleeve portion which respectively receive and support seven locking slips 54. The outer surfaces of the slips 54 are tapered in a manner to compliment the taper of the upper end portion 50e of the sub 50, and the inner surfaces of the slips 54 are provided with teeth 54a which engage the outer surface of the reeled tubing 24 in the connected position shown in FIGS. 2 and 3. The portion of the sub 50 through which the windows 50f extend define flat surfaces against which the corresponding surface of the slips 54 can abutt, thus positively retaining the slips in the windows. An outer surface of an intermediate portion 50g of the sub 50 is externally threaded for reasons to be described.

A portion of an intermediate coupling sleeve 56 extends over the sub 50 and includes an internally threaded lower end portion 56a which is in threaded engagement with the threaded intermediate portion 50g of the sub 50. The sleeve 56 has an intermediate portion 56b the bore of which has a taper that corresponds to the taper of the slips 54 and the tapered upper end portion 50e of the sub 50. Thus, as the sleeve 56 is rotated and advanced downwardly, as viewed in FIG. 2, over the sub 50, the tapered bore of the sleeve 56 engages the slips 54 and cams, or forces, them into locking engagement with the corresponding outer wall portion of the reeled tubing 24.

The outer surface of the upper end portion 56c of the sleeve 56 is tapered inwardly as shown, and a plurality of angularly-spaced windows, 56d, similar to the windows 50f of the sub 50, are formed therethrough for receiving a plurality of locking slips 58 which are similar to the slips 54 discussed above. Thus, the slips 58 are tapered in a manner to compliment the taper of the tapered upper end portion 56c, and the inner surfaces of the slips 58 are provided with teeth 58a which lockingly engage the corresponding outer surface of the reeled tubing 24.

An outer surface of an intermediate portion 56e of the sleeve 56 is threaded to receive an internally threaded lower end portion 60a of an end sub 60. The bore of an intermediate portion 60b of the sub 60 is tapered in a manner to compliment the slips 58 and the tapered end portion 56c of the sleeve 56. Thus, as the end sub 60 is rotated and advanced downwardly, as viewed in FIG. 2, over the sleeve 56, the tapered bore of the sub 60 engages the slips 58 and forces them into locking engagement with the outer surface of the reeled tubing 24.

In the event an even greater torsional coupling is desired between the reeled tubing 24 and the motor 18, one or more additional coupling sleeves, which would be identical to the coupling sleeve 56, would be installed between the sleeve 56 and the end sub 60, and each additional sleeve would have a set of slips for engaging the reeled tubing.

It thus can be appreciated that, as a result of the foregoing arrangement, the subs 50 and 60 together with the sleeve 56 form a mandrel for receiving the reeled tubing 24 which is positively locked against any axial and rotational movement relative to motor 18. As a result, the reeled tubing 24 can support well completion tools which produce tensile stresses up to the tensile stress limits of the reeled tubing.

The connector 36b is similar to the connector 36a, except that the connector 36b is positioned as shown in FIG. 1 with the sub 50 positioned uppermost and provided with external threads to engage internal threads provided in the lower portion of the hanger sleeve 30. The connector 36b thus locks the reeled tubing 24 relative to the hanger sleeve 30 in the same manner that the connector 36a locks the reeled tubing relative to the motor 18.

Figure 4:
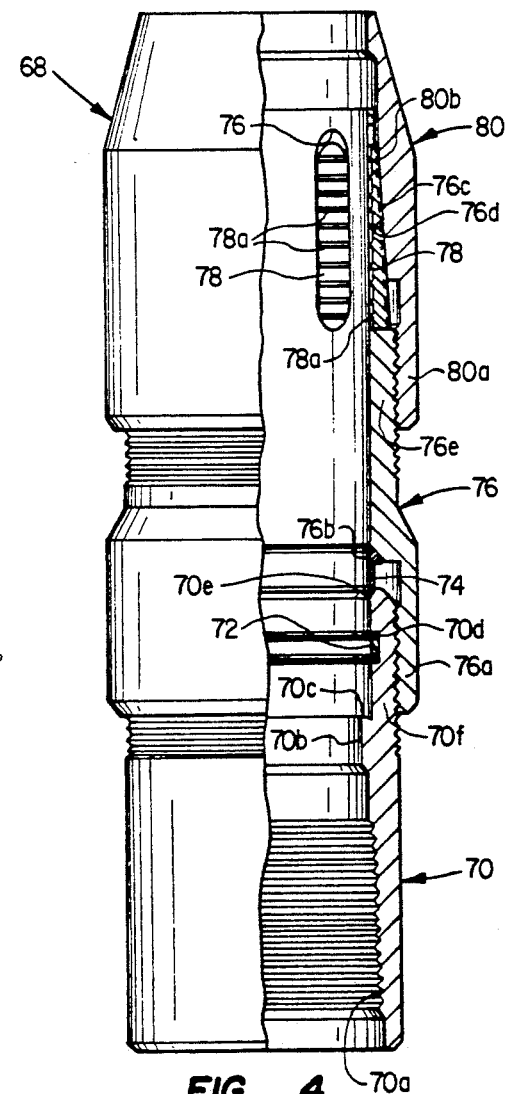
FIG. 4 is a view similar to FIG. 2, but showing an alternate embodiment of the connector of the present invention.

An alternate embodiment of the connector of the present invention is shown by the reference numeral 68 in FIGS. 4 and includes a lower end sub 70 having a lower end portion provided with internal threads 70a to receive a corresponding externally threaded sub, or sleeve (not shown) of the motor 18. An annular flange 70b is formed on the inner surface of the sub 70 to define a load-bearing shoulder 70c. Although the reeled tubing of the previous embodiment has been omitted in FIG. 4 for the convenience of presentation, it is understood that the tubing would extend into the connector 68 with its corresponding end in abuttment with the load-bearing shoulder 70c. An annular groove 70d is formed in the inner surface of the sub 70 which receives an elastomeric seal ring 72 for engaging a corresponding portion of the outer wall of the reeled tubing 28.

An inwardly-facing, tapered shoulder 70e is formed on the upper end portion of the sub 70 and a metal-to-metal seal ring, or ferrule, 74 is supported in abutment with the shoulder 70e. An example of the seal ring 74 is shown in FIG. 30 on page 607 of *The SAE Handbook Supplement, 1970 Edition*.

The outer surface of the upper end portion 70f of the sub 70 is externally threaded for receiving an intermediate coupling sleeve 76. The sleeve 76 extends over the sub 70 and includes an internally threaded lower end portion 76a which is in threaded engagement with the threaded upper end portion 70f of the sub 70. The sleeve 76 has an internal shoulder 76b which is tapered to correspond to the shape of the upper end of the seal ring 74. Thus, as the sleeve 76 is rotated and advanced downwardly over the sub 50 as viewed in FIG. 4, the tapered shoulder 76b of the sleeve 76 engages the seal ring 74 and forces its lower end into engagement with the tapered shoulder 70e of the sub 70 causing the inner surface of the seal ring 74 to be forced radially inwardly into locking engagement with the corresponding outer wall portion of the reeled tubing 28. This engagement forms a metal-to-metal fluid seal, or barrier, with the outer surface of the reeled tubing 24.

The upper end portion 76c of the sleeve 76 is tapered inwardly, and a plurality of angularly-spaced windows 76d, two of which are shown in FIG. 4, are formed through the sleeve for receiving a plurality of locking slips 78, two of which are also shown. It is understood that seven such windows and slips are provided, which are similar, if not identical, to the windows and slips of the previous embodiments. The slips 78 are tapered in a manner to compliment the taper of the tapered end portion 76c of the sleeve 76, and the inner surfaces of the slips 78 are provided with teeth 78a which engage the corresponding outer surface of the reeled tubing 28, as in the previous embodiment.

An outer surface of an intermediate portion 76c of the sleeve 76 is threaded to receive a threaded lower end portion 80a of an end sub 80. The bore of an intermediate portion 80b of the sub 80 is tapered in a manner to compliment the slips 78 and the tapered end portion 76c of the sleeve 76. Thus, as the end sub 80 is rotated and advanced downwardly over the sleeve 76, the tapered bore of the sub 80 engages the slips 78 and forces them into engagement with the outer surface of the reeled tubing 24.

As described above in connection with the previous embodiment, the end sub 80 can be removed and one or more coupling sleeves identical to the sleeve 76 can be added between the sleeve 80 and the sleeve 76. The sleeve 76 and the additional sleeves would be configured to receive a seal member 74 between them and the upper and portion of the additional sleeve would be provided with windows for receiving slips as described above.

It thus can be appreciated that the connector 68 of FIG. 4 enjoys the above-mentioned advantages of the connectors of the previous embodiment.

Several advantages result from the foregoing. For example, each connector of the present invention functions to lock the reeled tubing 24 against any axial or torsional movement relative to the motor 18 and the casing hanger 30. Also, the seal rings 52, 72 and 74 provide a positive seal against any fluid leakage between the connectors 36a and 68 and the reeled tubing 24. Further, production fluid from the discharge head 20a flows upwardly to the wellhead 10 in an annular passage defined between the inner surface of the tubing string 12 and the outer surfaces of the connectors 36a and 36b (and 68) and the reeled tubing 24.

The connectors of the present invention are not limited for use in connection with submersible pumps but can be used to install a wide variety of downhole completion equipment, in the form of tools, including landing nipples, etc. within a wellbore by simply attaching an externally-threaded sub, or the like, to the internal threads 50a and 70a provided on the lower end portions of the sub 50 of the connector 34a and the sub 70 of the connector 68, respectively.

The disclosure of each of the above-cited patents and patent application is incorporated by reference and a latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A connector for connecting tubing to a component in a manner to transfer loads between said tubing and said component, said connector comprising:
   a first member for connecting to said component;
   a second member defining, with said first member, a bore for receiving said tubing;
   said first and second members adapted for movement relative to each other; and
   locking means cooperating with at least one of said members and actuatable upon said movement to transfer axial and torsional loads between said component and said tubing.

2. The connector of claim 1 wherein said first member is a sub member adapted for threaded connection to said component, and said second member is a sleeve having an end portion adapted to extend over a corresponding end portion of said sub member.

3. The connector of claim 2 wherein said locking means is in the form of a plurality of locking slips supported by said sub member.

4. The connector of claim 3 wherein said locking slips are disposed in respective angularly-spaced windows formed through said sub member.

5. The connector of claim 3 wherein said sleeve member engages said locking slips upon said movement for forcing said locking slips into locking engagement with said tubing.

6. The connector of claim 5 further comprising cooperating threads formed on said sub member and said sleeve member for connecting said members as said sleeve member is rotated and advanced over said sub member to effect said movement.

7. The connector of claim 6 wherein a portion of the inner surface of said sleeve member is tapered in a manner to force said locking slips radially inwardly into engagement with said tubing upon said advancement of said sleeve member over said sub member.

8. The connector of claim 3 further comprising a plurality of teeth formed on the inner surfaces of said locking slips for engaging said tubing.

9. The connector of claim 2 further comprising seal means extending between said tubing and said sub member.

10. The connector of claim 9 wherein said seal means comprises an annular groove formed in the inner surface of said sub member and an elastomeric seal ring disposed in said groove for engaging said tubing.

11. The connector of claim 9 wherein said seal means comprises a metal-to-metal seal ring having a first end adapted to engage the corresponding end of said sub member and a second end adapted to be engaged by said sleeve member.

12. The connector of claim 11 further comprising cooperating threads formed on said sub member and said sleeve member for connecting said members as said sleeve member is rotated and advanced over said sub member to effect said movement.

13. The connector of claim 12 wherein a portion of the end surface of said sleeve member is tapered in a manner to force said seal ring radially inwardly into engagement with said tubing upon said advancement of said sleeve member over said sub member.

14. The connector of claim 11 wherein said seal means further comprises an annular groove formed in the inner surface of said sub member and an elastomeric seal ring disposed in said groove for engaging said tubing.

15. The connector of claim 2 further comprising a cap member adapted to move relative to said sleeve member and having a bore for receiving said tubing.

16. The connector of claim 15 further comprising additional locking means supported by said sleeve member and adapted to engage said tubing upon said movement of said cap member with said sleeve member in a manner to transfer axial and torsional loads between said component and said tubing.

17. The connector of claim 16 wherein said additional locking means is in the form of a plurality of additional locking slips disposed in angularly-spaced windows formed through said sleeve member.

18. The connector of claim 17 wherein said cap member engages said additional locking slips upon said movement of said cap member with said sleeve member for forcing said additional locking slips into locking engagement with said tubing.

19. The connector of claim 18 further comprising cooperating threads formed on said cap member and said sleeve member for connecting said members as said cap members is rotated and advanced over said sleeve member to effect said movement.

20. The connector of claim 19 wherein a portion of the inner surface of said cap member is tapered in a manner to force said additional locking slips radially inwardly into engagement with said tubing upon said connection of said cap sub to said sleeve member.

21. The connector of claim 16 further comprising a plurality of teeth formed on the inner surface of said additional locking slips for engaging said tubing.

22. The connector of claim 1 wherein said component has a rotating member and wherein the connector transfers axial and torsional loads between said component and said tubing.

23. The connector of claim 2 further comprising means formed on the inner surface of said sub member for defining a load-transfer surface for engagement by the corresponding end of said tubing to locate said tubing relative to said members.

24. A connector for connecting reeled tubing to a component in a manner to transfer loads therebetween, said connector comprising:
   a sub member for connecting to said component;
   a sleeve member;
   said sub member and said sleeve member adapted for movement relative to each other;
   a cap member;
   said sleeve member and said cap member adapted for movement relative to each other;
   said sub member, said sleeve member and said cap member defining a bore for receiving said reeled tubing;
   first locking means supported by said sub member and responsive to said movement between said sleeve member and said sub member for engaging said tubing in a manner to transfer axial and torsional loads between said component and said reeled tubing; and
   second locking means supported by said sleeve member and responsive to said movement between said cap member and said sleeve member for engaging said tubing in a manner to transfer axial and torsional loads between said component and said reeled tubing.

25. The connector of claim 24 wherein said sleeve member and said cap member respectively engage said first and second locking means upon said movements for forcing said first and second locking means into locking engagement with said tubing.

26. The connector of claim 25 wherein said first and second locking means are in the form of a plurality of locking slips disposed in corresponding angularly-spaced windows formed through said sleeve member and said sub member, respectively.

27. The connector of claim 26 further comprising cooperating threads formed on said sub member, said sleeve member and said cap member for connecting said sleeve member to said sub member and said cap member to said sleeve member as said sleeve member is rotated and advanced over said sub member and as said cap member is rotated and advanced over said sleeve member, respectively to effect said respective movements.

28. The connector of claim 27 wherein a portion of the inner surfaces of said sleeve member and said cap member are tapered in a manner to force said locking slips radially inwardly into engagement with said tubing upon said advancements.

29. The connector of claim 27 further comprising a plurality of teeth formed on the inner surface of said locking slips for engaging said tubing.

30. The connector of claim 24 further comprising seal means extending between said tubing and said sub member.

31. The connector of claim 30 wherein said seal means comprises an annular groove formed in the inner surface of said sub member and an elastomeric seal ring disposed in said groove for engaging said tubing.

32. The connector of claim 30 wherein said seal means is in the form of a metal-to-metal seal ring having a first end adapted to engage said sub member and a second end adapted to be engaged by said sleeve member.

33. The connector of claim 32 further comprising cooperating threads formed on said sub member and said sleeve member for connecting said members as said sleeve member is rotated and advanced over said sub member to effect said movement between said sub member and said sleeve member.

34. The connector of claim 33 wherein portions of the end surface of said sleeve member is tapered in a manner to force said seal ring radially inwardly into engagement with said tubing upon said advancement of said sleeve member over said sub member.

35. The connector of claim 32 wherein said seal means further comprises an annular groove formed in the inner surface of said sub member and an elastomeric seal ring disposed in said groove for engaging said tubing.

36. The connector of claim 24 further comprising means formed on the inner surface of said sub member for defining a load-transfer surface for engagement by the corresponding end of said tubing to locate said tubing relative to said members.

37. A connector for attaching a well tool to a tubing string in a manner to transfer axial and torsional loads between the well tool and the tubing string comprising:
a plurality of hollow tubular means;
means for attaching the tubular means to each other to form a mandrel with a longitudinal bore therethrough;
one of the tubular means having an opening to allow insertion of the tubing string into the longitudinal bore;
one of the tubular means having heavy-duty threads for attachment of the well tool to the connector; and
locking means cooperating with at least one of the tubular means and actuatable upon operative engagement of the tubing string with the connector in a manner to transfer axial and torsional loads between the well tool and the tubing string.

38. The connector as defined in claim 37 wherein the means for attaching the tubular means to each other comprises:
a reduced diameter portion formed on one end of the tubular means and an enlarged diameter portion formed on the other end of the tubular means;
an opening in the enlarged diameter portion which is sized to receive the reduced diameter portion of another tubular means therein; and
matching threads on the interior of enlarged diameter portion and the exterior of the reduced diameter portion whereby adjacent tubular means are attached to each other.

39. The connector as defined in claim 38 wherein the locking means further comprises:
a plurality of windows extending radially through the reduced diameter portion of one of the tubular means;
a locking slip disposed in each window; and
the enlarged diameter portion of another tubular means having a tapered inside diameter which projects the locking slips radially inwardly when the reduced diameter portion of one tubular means is engaged with the enlarged diameter portion of another tubular means.

40. The connector as defined in claim 39 wherein the locking slips have a plurality of teeth formed on their inner surface to engage the exterior of the tubing string adjacent thereto.

41. A connector for attaching a well completion tool to a continuous length of reeled tubing comprising:
an elongated mandrel having a longitudinal bore with an opening on the upper end of the mandrel so that one end of the reeled tubing can be inserted into the longitudinal bore;
the mandrel being formed by a plurality of hollow tubular means which at least partially define the longitudinal bore;
a reduced diameter portion formed on one end of one tubular means and an enlarged diameter portion formed on one end of another tubular means;
an opening in the enlarged diameter portion which is sized to receive the reduced diameter portion;
matching threads on the interior of the enlarged diameter portion and the exterior of the reduced diameter portion whereby adjacent tubular means are attached to each other to form the elongated mandrel; and
locking means cooperating with at least one of the tubular means and actuatable upon engagement of the reeled tubing with the connector and upon the attachment of the adjacent tubular means to transfer axial and torsional loads between the well completion tool and the reeled tubing.

42. The connector of claim 41 wherein one of the tubular means has a heavy-duty threaded portion for attachment with the well tool.

43. The connector of claim 42 wherein the heavy-duty threaded portion is positioned below the locking means.

44. The connector of claim 43 wherein the locking means comprises:
- a plurality of windows extending radially through the reduced diameter portion of one of the tubular means;
- a locking slip disposed in each window; and
- the enlarged diameter portion having a tapered inside diameter which projects the locking slips radially inward when the reduced diameter portion is engaged with the enlarged diameter portion.

45. The connector of claim 44 wherein one of the tubular means comprises a load transfer surface defined in part by annular flange spaced longitudinally from the locking means and extending radially into the longitudinal bore to engage the lower end of the reeled tubing.

46. The connector of claim 45 wherein multiple locking means are provided to allow the reeled tubing to support well completion tools up the tensile strength limits of the reeled tubing.

* * * * *

UNITED STATES PATENT AND TRADEMARK OFFICE
CERTIFICATE OF CORRECTION

PATENT NO. : 5,156,206

DATED : October 20, 1992

INVENTOR(S) : Don C. Cox

It is certified that error appears in the above-identified patent and that said Letters Patent is hereby corrected as shown below:

Column 1, lines 51-52, change "values" to -- valves --.

Column 4, line 13, change "a" (first occurrence) to -- an --.

Column 6, line 17, change "76c" to -- 76e --.

Column 6, line 33, change "and" to -- end --.

Column 6, line 58, change "34a" to -- 36a --.

Column 8, line 22, change "members" to -- member --.

Column 12, line 8, after "up" add -- to --.

Signed and Sealed this

Twelfth Day of October, 1993

Attest:

BRUCE LEHMAN

*Attesting Officer*

*Commissioner of Patents and Trademarks*